US010270493B2

(12) United States Patent
Fitzgibbon

(10) Patent No.: US 10,270,493 B2
(45) Date of Patent: Apr. 23, 2019

(54) PORTABLE RECHARGEABLE TRANSMITTER

(71) Applicant: The Chamberlain Group, Inc., Oak Brook, IL (US)

(72) Inventor: James J. Fitzgibbon, Batavia, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 15/650,391

(22) Filed: Jul. 14, 2017

(65) Prior Publication Data

US 2019/0020362 A1 Jan. 17, 2019

(51) Int. Cl.
| | |
|---|---|
| *H02J 7/02* | (2016.01) |
| *H04B 5/00* | (2006.01) |
| *H02J 50/80* | (2016.01) |
| *H02J 50/10* | (2016.01) |
| *H02J 50/05* | (2016.01) |

(52) U.S. Cl.
CPC .......... *H04B 5/0037* (2013.01); *H02J 7/025* (2013.01); *H02J 50/05* (2016.02); *H02J 50/10* (2016.02); *H02J 50/80* (2016.02)

(58) Field of Classification Search
CPC .... H02J 7/02; H02J 7/025; H02J 50/05; H02J 50/10; H02J 50/80; H04B 5/0037
See application file for complete search history.

(56) References Cited

U.S. PATENT DOCUMENTS

| | | | |
|---|---|---|---|
| 3,936,833 A | 2/1976 | Bush | |
| 4,286,262 A | 8/1981 | Wahl | |
| 4,912,391 A | 3/1990 | Meadows | |
| 5,680,028 A | 10/1997 | McEachern | |
| 6,040,680 A | 3/2000 | Toya | |
| 6,154,544 A | 11/2000 | Farris | |
| 6,366,051 B1 | 4/2002 | Nantz | |
| 6,972,543 B1 | 12/2005 | Wells | |
| 9,233,645 B2 | 1/2016 | Schofield | |
| 2010/0144284 A1* | 6/2010 | Chutorash | G08C 17/02 455/66.1 |
| 2011/0136550 A1* | 6/2011 | Maugars | H02J 7/025 455/573 |

(Continued)

OTHER PUBLICATIONS

ARQ Universal remote control, user manual, 12 pages, publicly available before Jul. 14, 2017.

(Continued)

*Primary Examiner* — Duc M Nguyen
(74) *Attorney, Agent, or Firm* — Fitch, Even, Tabin & Flannery LLP

(57) ABSTRACT

In accordance with one aspect of the present disclosure, a method is provided for charging a movable barrier operator transmitter in a vehicle. The method includes connecting a transmitter and a component of the vehicle, transmitting an initiation signal from the transmitter to the component, and transmitting an inquiry signal from the component to the transmitter. The inquiry signal may include charging information. The method includes transmitting an answer signal from the transmitter to the component that includes information responsive to the charging information. The method further includes energizing a charging coil of the component to create an electromagnetic field and charge a battery of the transmitter.

16 Claims, 7 Drawing Sheets

(56) References Cited

U.S. PATENT DOCUMENTS

| | | | | |
|---|---|---|---|---|
| 2011/0181235 | A1* | 7/2011 | Walley | H02J 7/0055 320/103 |
| 2012/0091948 | A1* | 4/2012 | Shinde | B60R 7/04 320/108 |
| 2012/0169293 | A1* | 7/2012 | Won | H02J 7/025 320/137 |
| 2013/0058379 | A1* | 3/2013 | Kim | H04B 5/0031 375/146 |
| 2013/0249479 | A1* | 9/2013 | Partovi | H02J 7/025 320/108 |
| 2013/0285603 | A1* | 10/2013 | Zeinstra | H02J 7/0004 320/108 |
| 2014/0347009 | A1* | 11/2014 | Hongo | H02J 17/00 320/108 |
| 2015/0148983 | A1 | 5/2015 | Fitzgibbon | |
| 2015/0228132 | A1* | 8/2015 | Geerlings | G08C 17/02 340/5.22 |
| 2015/0326035 | A1* | 11/2015 | Murayama | H02J 5/005 307/104 |
| 2015/0351145 | A1* | 12/2015 | Burks | G08C 17/02 455/41.3 |
| 2016/0028430 | A1* | 1/2016 | Crawford | H04M 1/0262 455/575.8 |
| 2016/0276865 | A1* | 9/2016 | Pike | B60R 11/0241 |
| 2016/0365745 | A1* | 12/2016 | Hyun | H02J 7/025 |
| 2016/0380454 | A1* | 12/2016 | Larson | H02J 7/0044 320/108 |
| 2018/0212447 | A1* | 7/2018 | Tabata | H02J 7/00 |

OTHER PUBLICATIONS

Transcription and screencaptures of YouTube Video, "How to program ARQ™ Universal Remote Control to Garage Door Opener with Program/Learn button", retrieved from https://www.youtube.com/watch?v=58kP4wFbmn0 , published Mar. 17, 2017, 13 pages.

Transcription and screencaptures of YouTube Video, "How to program the ARQ™ Universal Remote Control with a Garage Door Opener with Switches", retrieved from: https://www.youtube.com/watch?v=J2LBcqUmZHg , published Mar. 17, 2017, 24 pages.

Transcription and screencaptures of YouTube Video, "How to reset the ARQ™ Universal Remote Control to factory default settings", retrieved from: https://www.youtube.com/watch?v=eecwZ _rOQ A1 , published on Mar. 17, 2017, 6 pages.

Transcription and screencaptures of YouTube Video, "How to update the firmware in the ARQ™ Universal Remote Control", Retrieved from: https://www.youtube.com/watch?v=vDlkg7R2bms Published Mar. 17, 2017, 12 pages.

Transcription and screencaptures of YouTube Video, "Identify your type of Garage Door Opener before setting up the ARQ™ Universal Remote Control", retrieved from: https://www.youtube.com/watch?v=DE560eIX6JU , published Mar. 17, 2017, 15 pages.

* cited by examiner

PORTABLE RECHARGEABLE TRANSMITTER

TECHNICAL FIELD

This invention relates generally to transmitters for movable barrier operators and, more particularly, to movable barrier operator transmitters that are portable and may be carried by a user.

BACKGROUND

Transmitters are used in a variety of applications in which wireless operation is desired. For example, many movable barrier operators such as garage door openers, gate operators, and rolling shutter systems utilize transmitters to operate the movable barrier associated with the operator (i.e., to operate the door, gate, or shutter). Many of the transmitters supplied with these products are designed as single function, single frequency devices with a preset carrier frequency and use either a switch-selectable code or preset factory codes. A switch-selectable code is selected by the user setting a plurality of switches on the transmitter and a receiver of the movable barrier operator. Because both the transmitter and the receiver have matching switch-selected codes, the receiver can authenticate a signal sent from the transmitter that represents the switch-selected code.

Preset factory codes are programmed into the transmitter by its manufacturer and are learned by a receiver of a movable barrier operator by the user causing a controller (e.g., microcontroller or other processor such as a microprocessor, gate array or the like) of the receiver to enter a learn mode. After the receiver enters the learn mode, the user activates the transmitter so that the transmitter transmits a signal representing the factory programmed code stored in the transmitter. The receiver of the movable barrier operator receives the signal and determines the preset factory code from the signal. The movable barrier operator thereby "learns" the code of the transmitter. After the receiver exits the learn mode, the operator will operate in response to receiving a signal from the transmitter that represents the factory programmed code.

Rolling code transmitters may be used with movable barrier operator to provide additional security. An example of a rolling code generating transmitter of the type described herein is disclosed in U.S. Pat. No. 6,154,544 issued Nov. 28, 2000, which is hereby incorporated herein by reference.

Some prior portable transmitters are not rechargeable so they must have one or more large batteries that can last for multiple years. The one or more batteries are a driving design factor that requires the entire transmitter to be larger. Alternatively, some transmitters are integrated into vehicles so that they are powered by the vehicle and do not need a battery. These integrated transmitters are not suitable for many applications, because they cannot be removed to be used by pedestrians or transferred between vehicles.

Figure 1A:
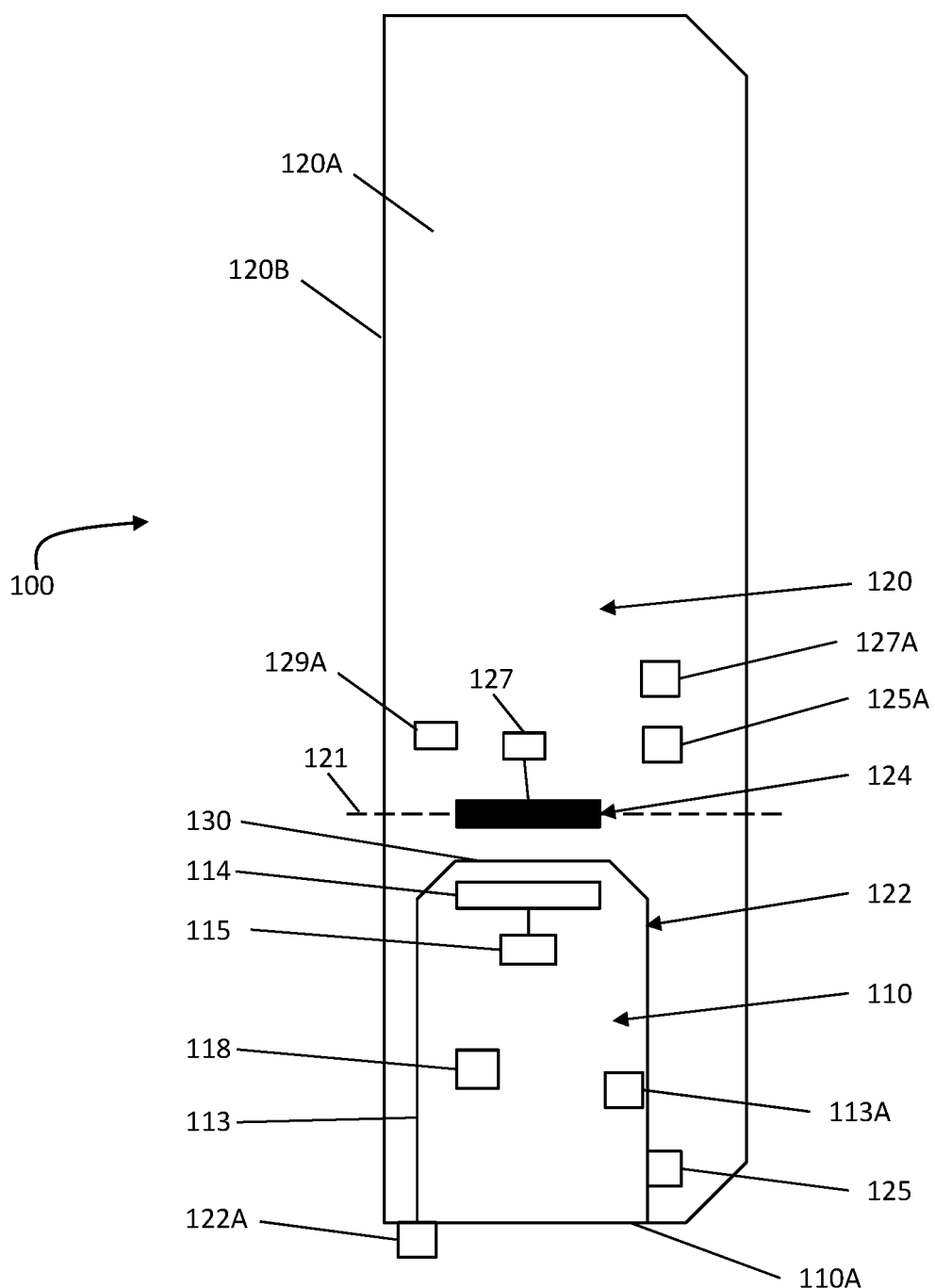
FIG. 1A is a schematic drawing of a rechargeable transmitter system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In accordance with one aspect of the present disclosure, a portable rechargeable transmitter is provided for operating a movable barrier operator. The transmitter includes a battery and an induction coil operably connected to the battery. The induction coil is configured to charge the battery with a current induced from an electromagnetic field produced by a vehicle. The transmitter includes communication circuitry configured to transmit a radio signal to operate a movable barrier operator. The communication circuitry may be configured to transmit an initiation signal to begin a handshake or linking of the transmitter and the vehicle and/or begin charging of the transmitter. The radio signal for operating the movable barrier operator may include the initiation signal, or the initiation signal may be a separate signal such as being sent using a different communication protocol. The initiation signal may include information identifying the transmitter and information used to authenticate the transmitter. The authenticating information may be variable, such as a rolling code, to increase the security of the transmission from the transmitter.

The vehicle authenticates the transmitter using the initiation signal and sends an inquiry signal back to the transmitter. The inquiry signal may include charging information such as the current the vehicle can provide to the transmitter via an electromagnetic field produced by a charging coil of the vehicle. The transmitter includes a controller operably coupled to the communication circuitry and configured to determine the charging information from the inquiry signal. The controller is configured to cause the communication circuitry to transmit an answer signal to the vehicle to initiate the electromagnetic field in response to the communication circuitry receiving the inquiry signal. The answer signal may include, for example, a desired current, voltage, and/or charging duration to recharge the transmitter battery. In this manner, the transmitter is linked to the vehicle and the vehicle efficiently charges the transmitter battery as requested by the transmitter.

With reference to FIG. 1A, an insertable transmitter system 100 is provided that includes a transmitter 110 and a vehicle component 120 having a socket or recess 122 configured to receive at least a portion of the transmitter 110.

The vehicle component 120 can be any portion of the interior of a vehicle that is within easy reach of the driver. This can include, but is not limited to, the rearview mirror, the dashboard, the steering wheel, the steering column, the headliner, the glove box, the door, and the center console. With reference to FIG. 1A, the vehicle component 120 may be a rearview mirror having a body 120A and a mirror 120B. The vehicle component 120 or the transmitter 110 may include a transmitter retainer to keep the transmitter 110 within the recess 122. For example, the vehicle component 120 may include a retention member 122A that overlaps a surface 110A of the transmitter 110 to resist back-out of the transmitter 110. The retention member 122A may have a cam surface that cammingly engages the transmitter 110 as the transmitter 110 is advanced into the recess 122 to shift the retention member 122A to an open position out of the path of the transmitter 110. Once the transmitter 110 is seated in the recess 122, the retention member 122A may be spring-biased toward the closed position wherein the retention member 122A overlaps the transmitter surface 110A. To release the transmitter 110 from the recess 122, a user may shift the retention member 122A from the closed position to the open position against the bias of the spring. With the retention member 122A in the open position, the user can withdraw the transmitter 110 from the recess 122.

The transmitter 110 includes a housing 113, a controller 113A, a battery 115, an induction coil 114 electrically coupled to the battery 115, and communication circuitry for sending signals to a movable barrier operator and sending/receiving signals with the vehicle component 120. For example, the communication circuitry may include a radio wave generator such as radio broadcaster 118 configured to transmit radio frequency (RF) waves. In some embodiments, the transmitter 110 is programmable such as by having a user interface that may be manipulated by a user to associate the transmitter with a particular type of movable barrier operator. Examples of such a user interface include dip switches that can be set by a user or a button that may be pressed a set number of times to associate the transmitter with a particular type of movable barrier operator. A charging coil 124 is located in the vehicle component 120 proximate to the socket 122. The charging coil 124 is wired to and receives power from the electrical system of the vehicle. A switch 127 controls the flow of current from the electrical system to the charging coil 124. In some embodiments, the switch 127 is analog such that the current to the charging coil 124 can be adjusted to various current levels. In some forms, the switch 127 varies the current by switching between a plurality of different power circuits. In other forms, the switch 127 includes a variable resistor such that the power through the charging coil 124 can be infinitely varied. In yet another form the switch can be pulsed, varying the current in a switch mode fashion.

Figure 1B:
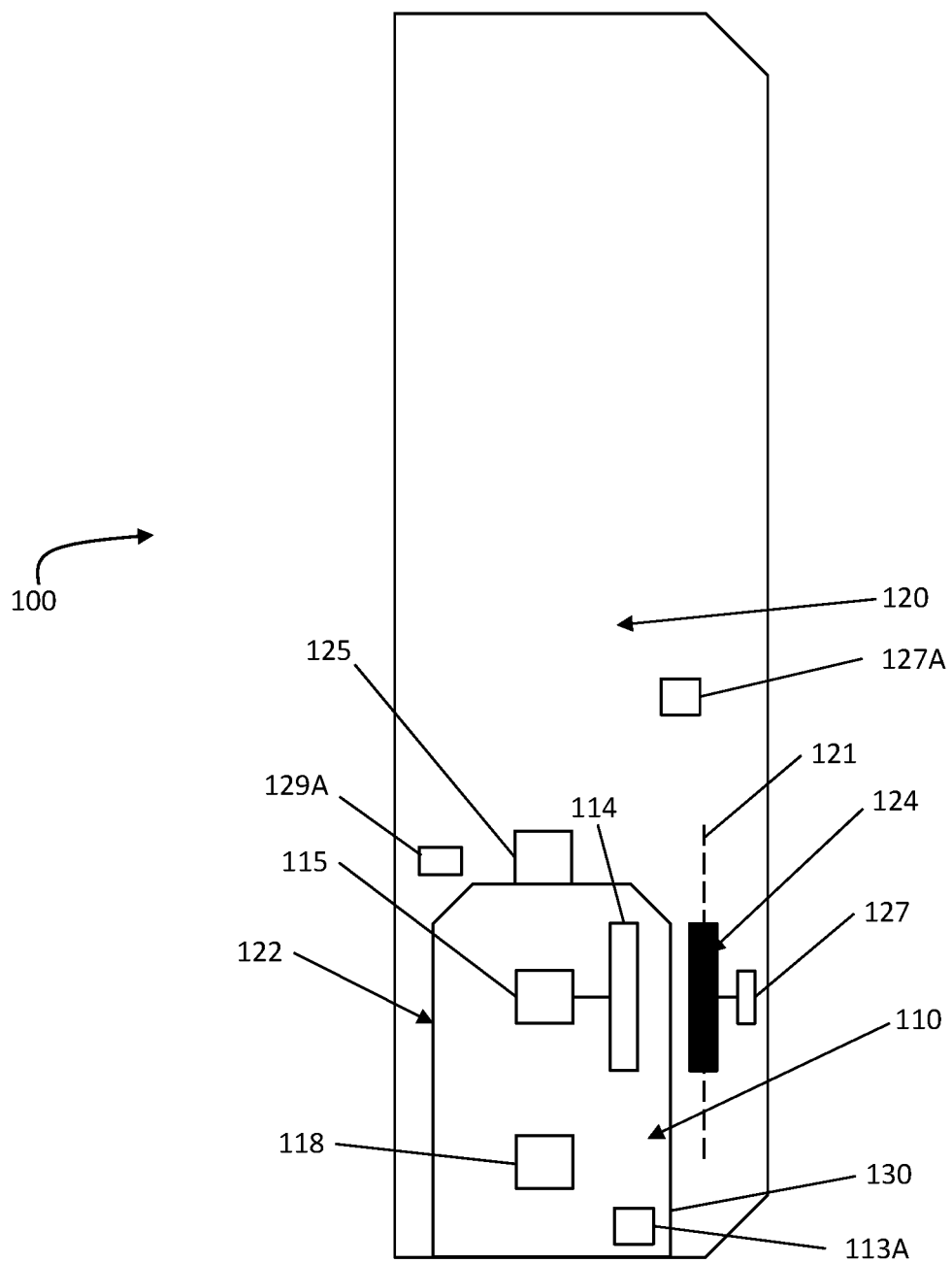
FIG. 1B is a schematic drawing of a rechargeable transmitter system.

The charging coil 124 can be placed anywhere around the socket 122. In FIG. 1A, a longitudinal axis 121 of the charging coil 124 runs parallel to a nearby external surface 130 of the transmitter 110. The transmitter 110 has the coil 114 near the external surface 130 of the housing 113 of the transmitter 110. The coil 114 may be positioned in the housing 113 such that when the transmitter 110 is inserted into the socket 122, the coil 114 is near the charging coil 124 and the coils 114, 124 are substantially parallel. The coils 114, 124 being parallel increase the efficiency of the power transfer via induction. In FIG. 1A, the coils 114, 124 are positioned at a leading end of the transmitter 110. In FIG. 1B, the coils 114, 124 are positioned along the side of the transmitter 110.

The vehicle may control the switch 127 based on the presence of the transmitter 110 in the socket 122. In one form, the socket 122 includes a mechanical switch 125 that is actuated by the insertion of the transmitter 110. For example, the presence of the transmitter 110 in the socket 122 may depress a portion of the switch 125. The vehicle actuates the switch 127 in response to the depression of the portion of the switch 125 which closes the power circuit to the charging coil 124. In another form, the socket 122 includes a proximity sensor, such as a reed switch, or an optical sensor (such as an optical interruption detector) or magnetic sensor which detects the presence of the transmitter 110 without physical contact.

In another form, the controller 113A of the transmitter 110 causes the communication circuitry to transmit an initiation signal to link the transmitter 110 and vehicle component 120 and/or begin charging of the transmitter 110. The initiation signal may be sent using a wired or wireless approach. In one form, the vehicle component 120 includes a wireless receiver 125A that receives the initiation signal from the transmitter 110. When the wireless receiver 125A receives the initiation signal from the transmitter 110, the switch 127 is closed and current is provided to the charging coil 124. In one form, the vehicle includes a controller 127A including a processor coupled to the wireless receiver 125A and the switch 127. Examples of the controller 127A include an 8-bit microcontroller from the Microchip PIC family 16F157 and a custom controller integrated circuit. When the initiation signal from the transmitter 110 is received at the wireless receiver 125A, the controller 127A uses information of the initiation signal, such as determining whether the transmitter 110 is an approved type of transmitter, to authenticate the transmitter 110.

If the transmitter 110 is authenticated, the controller 127A causes a transmitter 129A of the vehicle component 120 to transmit an inquiry signal containing charging information to the transmitter 110. The inquiry signal may be sent by wired or wireless approaches. In one form, the transmitter 129A is a wireless transmitter and sends the inquiry signal wirelessly to the wireless receiver 125A of the transmitter 110. The transmitter 129A and wireless receiver 125A may be provided as a transceiver rather than separate components. An example of a transceiver is a 300-900 band Silab Si4421 that may be integrated with a processor, such as the Silab EZR32HG. Another example of a transceiver is a 125 khz would be like the MLX90109 from Melexis. The transceiver selected for a particular embodiment may depend on the desired frequency of communication.

The charging information of the inquiry signal may include, for example, the current(s) the charging coil 124 is capable of providing. The inquiry signal may also include information regarding the range of adjustment for the charging coil 124, such as pulse width, duty cycle, and/or current control. An example of current control information that may be included in the inquiry signal includes maximum amount and range of control, such as 1 amp maximum and 30 db adjustment with 5 db steps. The controller 113A of the transmitter 110 determines the charging information from the inquiry signal and causes the communication circuitry of the transmitter 110 to send an answer signal to the wireless receiver 125A of the vehicle component 120. The answer signal is responsive to the inquiry signal and may include data the vehicle component controller 127A uses to energizing the charging coil 124, such as a particular current supply or charging time. The answer signal may include information representative of the amount of electrical energy stored in the battery 115 of the transmitter 110.

The vehicle component controller 127A operates the switch 127 to power the induction charging coil 124. The vehicle operates the switch 127 based on the information from the answer signal. For example, the vehicle may close the switch 127 and energize the charging coil 124 to charge the battery 115 when the answer signal indicates the battery 115 contains low voltage. If the battery 115 has voltage over a predetermined level, the vehicle may keep the switch 127 open so that the battery 115 is not charged.

In other forms, the vehicle may not include the recess 122. Instead, the charging coil 124 is located near a support surface on which the transmitter 110 can rest, such as on top of a dashboard or a rear view mirror. Alternatively, the charging coil 124 is near the surface of a compartment into which the entire transmitter can be placed, such as a glove box or a center console. The charging coil 124 may be powered in response to a wireless signal being received at the vehicle wireless receiver 125A from the transmitter 110 indicating the transmitter 110 is proximate to the charging coil 124.

Figure 2:
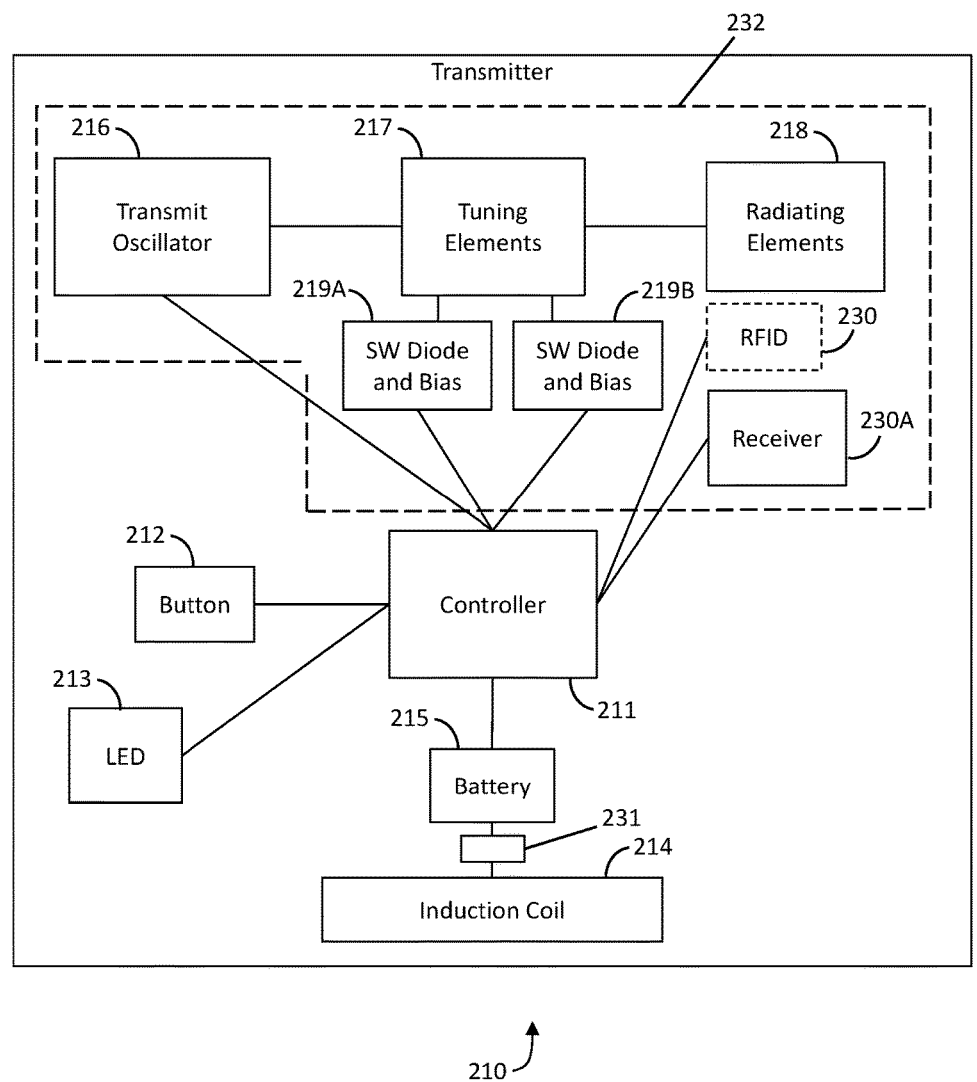
FIG. 2 is a block diagram of a rechargeable transmitter.

FIG. 2 is a block diagram of a transmitter 210 that is similar in many respects to the transmitter 110 and may be connected to the vehicle component 120. The transmitter 210 includes a controller 211, a user interface such as a button 212, a LED circuit 213, communication circuitry 232, a battery 215, and an induction coil 214. The communication circuitry 232 may include a transmit oscillator 216, tuning elements 217, radiating elements 218, and switching circuits 219A/219B for transmitting a radio frequency (RF) signal.

The transmit oscillator 216 generates RF signals to be sent to a receiver to operate a barrier operator. The radiating elements 218 transmit the signal generated by the transmit oscillator 216. In one form, the radiating elements 218 comprise a printed circuit (PC) trace inductive radiating element.

The controller 211 controls the communication circuitry 232 to output specific signals. The controller 211 may include a memory unit adapted to store codes to be sent to the transmit oscillator 216. The controller 211 also controls the output frequency of the tuning elements 217. The controller 211 outputs enable or disable signals to the switching modules 219A, 219B which causes the switching modules 219A, 219B to selectively add or take out various reactive elements in the tuning circuit 217. This adding or taking out of reactive elements selectively varies the electrical length of radiating element 218 allowing the selection of a transmit frequency. In one form, the switching modules 219A, 219B are operable to switch the transmit frequency between at least two of 300 MHz, 310 MHz, 315 MHz, and 390 MHz.

In operation, the controller 211 receives an input from the button 212. In response to the input, the controller 211 outputs a code to the transmit oscillator 216 and outputs frequency controls to the switching modules 219A, 219B to control the RF signal generated. The radiating elements 218 transmit the RF signal to nearby receiver(s), such as a receiver of a barrier operator.

The controller 211 also controls an LED circuit 213 to provide visual feedback to a user. In one form, the LED circuit 213 lights up an associated LED when the transmitter 210 is operated to send an RF signal. In other forms, the LED circuit 213 also provides a visual indicator of various states of the transmitter 210 including low battery. If the transmitter 210 is a programmable transmitter, the LED circuit 213 may also provide visual feedback during the programming process.

The transmitter 210 is powered by a rechargeable battery 215. In one form, the battery 215 provides power to the controller 211, and the controller 211 in turn provides this power to the other components. In other forms, the components are connected to the battery 215 by switches or relays which are controlled by the controller 211. The battery 215 is electrically coupled to an induction coil 214. When the transmitter 210 is placed proximate to an electrified coil of a vehicle, such as the charging coil 124 described above, the electrical field generated by the charging coil 124 induces a current in the induction coil 214. The induced current flows to the battery 215 and charges the battery 215. In one form, a switch 231 controls the electrical connection between the induction coil 214 and the battery 215. The switch 231 opens the connection when the battery 215 is fully charged. Through operation of the switch 231, electrical current is not provided to the battery 215 once the battery 215 is fully charged which increases the lifespan of the battery 215. In one form, the switch 231 is operated by the controller 211 based on a voltage sensor or a timer. In other forms, the switch 231 is directly controlled by a voltage sensor to open when the battery 215 is fully charged.

The communication circuitry 232 may include a secondary transmission circuit, such as a RFID chip 230. The RFID chip 230 operates over a shorter range wireless communication protocol than the radiating elements 218. The RFID chip 230 may be used to transmit signals to the vehicle component 120 to control power to the charging coil 124 as discussed above. In other forms, the secondary transmission circuit utilizes another type of short range wireless communication protocol such as Bluetooth®, WiFi, infrared, or ZigBee.

The communication circuitry 232 may include a wireless receiver 230A instead of or in addition to the RFID chip 230. The wireless receiver 230A receives signals and communicates them to the controller 211. In one approach, the received signals are used to program the programmable transmitter 210. In one form, the controller 211 configures the communication circuitry 232 to replicate a signal received by the receiver 230A. In another form, the controller 211 includes memory storing a plurality of signals and the received signal indicates which one of the stored signals the transmitter 210 is to transmit. In one form, the communication circuitry 232 is a transceiver that can transmit and receive RF signals, with the controller 211 learning RF signals received by the RF signal circuit.

Figure 3:
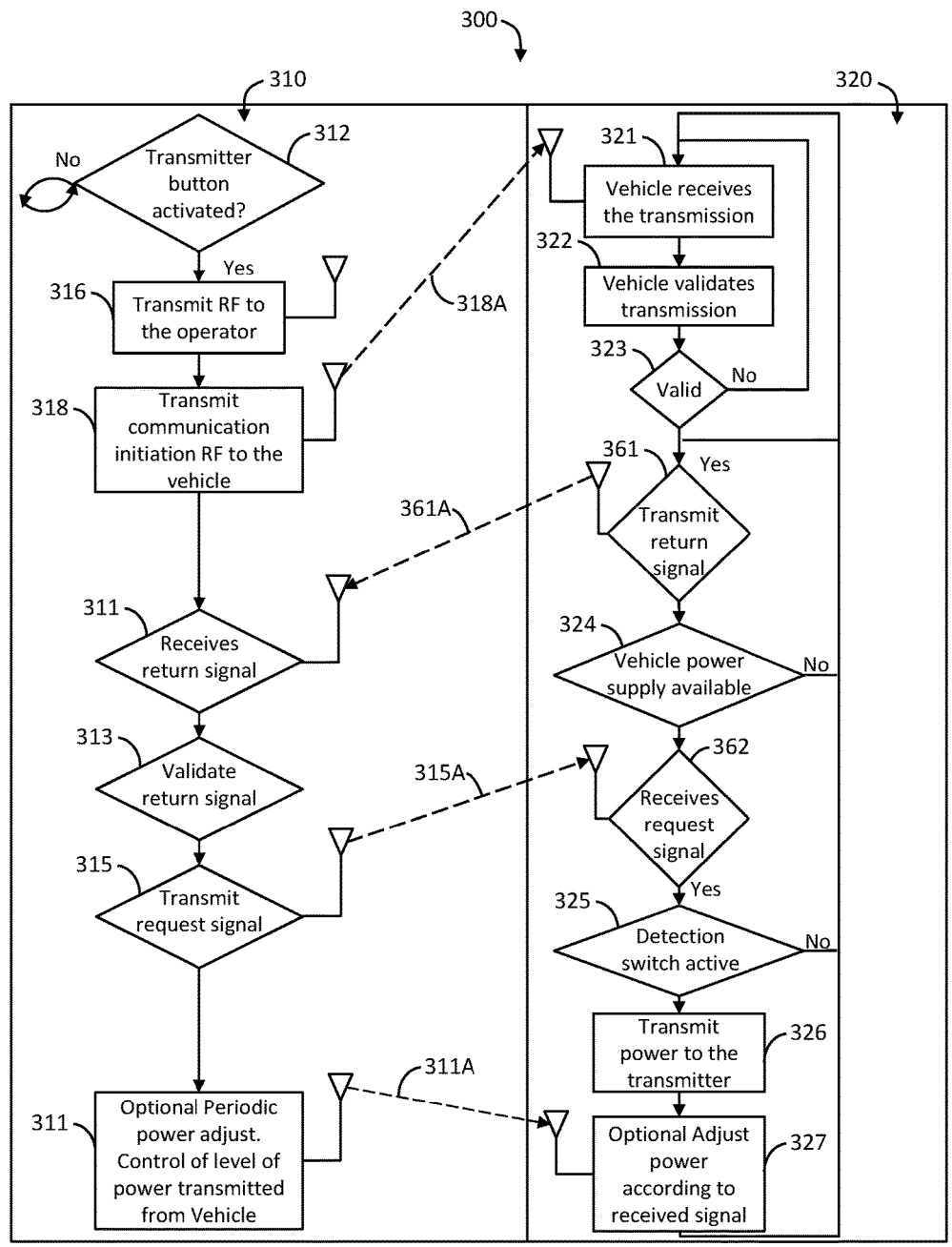
FIG. 3 is a flow diagram illustrating a method of recharging a transmitter.

With reference to FIG. 3, a method 300 is provided for operating the insertable transmitter 210 described above. The method 300 includes a method 310 of operating the transmitter 210 and a method 320 of operating the vehicle component 120.

The method 310 begins when the transmitter button 212 is activated 312, such as by a user pressing the button 212. In response to the button 212 being activated, the transmitter 210 transmits 316 a RF signal to the barrier operator and transmits 318 an initiation signal, such as signal 318A, to the vehicle 120. The signal 318 may include first information, such as information identifying the transmitter 210, and second information, such as a code to operate a movable barrier operator. The code may be variable, such as a rolling code, which changes each time a user presses the button 212. In one form, the transmitter 210 transmits a single signal that controls both the movable barrier operator and the charging circuit of the vehicle component 120. In one form, the transmitter 210 transmits two signals using different protocols, such as an RF signal 316 to the movable barrier operator and a Bluetooth® signal 318A to the vehicle. In another approach, the method 310 begins in response to a mechanical switch of the vehicle component 120 or the transmitter 210 detecting the transmitter 210 has been connected to the vehicle component 120. For example, the transmitter 210 may have a switch that closes when the transmitter 210 is seated in the recess 122 which causes the transmitter 210 to transmit 318 the initiation signal 318A. As another example, the vehicle component 120 may include the mechanical switch 125 and the vehicle component 120 initiates communication with the transmitter 210 in response to the switch 125 being closed once the transmitter 210 is received in the recess 122.

The signal 318A transmitted 318 by the transmitter 210 is received 321 by the vehicle. In some forms, the vehicle authenticates or validates 322 the received code. Validation may include determining whether the signal was sent by an approved transmitter. In one form, validation 322 by the vehicle is similar to the process a movable barrier operator uses to validate a signal from the transmitter 210. For example, the validation 322 may include the vehicle determining information identifying the transmitter 210 to decide whether the transmitter 210 is an approved brand of transmitter. The validation 322 may also include determining whether the code of the signal 318A is authorized, such as by using a rolling code decryption technique. In some forms, the vehicle has a predetermined validation code which must be received 321 from the transmitter 210 in order to validate 322. In this form, the vehicle component 120 programs the validation code into the transmitter 210 before the start of method 300.

In another form, the vehicle component 120 may be programmable to validate one or more programmed codes. The vehicle component 120 is entered into a programming state and the transmitter 210 is operated to transmit a signal. The vehicle component 120 stores the transmitted signal in memory and validates 322 the signal when it is received 321 from the transmitter 210. In this manner, the transmitter 210 can program the barrier operator and can program the vehicle component 120 to validate the same code as the movable barrier operator.

In some forms, the code contained in the signal 318A is encrypted. For example, the code may be a rolling code that changes every time the transmitter 210 is operated. The vehicle component 120 decrypts at least a portion of the signal 318A as part of the validation 322.

In one form, the transmitter 210 may transmit 318 the signal 318A every time the transmitter 210 transmits 316 a RF signal to the movable barrier operator, regardless of whether the transmitter 210 needs to be charged or not. In another form, the transmitter 210 transmits 318 the signal 318A only when the transmitter 210 needs to be charged.

If the received signal 318A is valid, the vehicle transmits 361 an inquiry signal 361A to the transmitter 210. The transmitter 210 receives 311 the inquiry signal 361. In some forms, the inquiry signal 361A is validated 313 by the transmitter 210. Validation may include determining whether the signal was sent by an approved vehicle. Additionally or alternatively, the inquiry signal 361A includes information representing the available charging power, such as available power, current, and/or voltage. In one form, the vehicle transmits 361 the inquiry signal 361A only if the mechanical switch 125 detects 325 a transmitter 210.

Upon receipt 311 and validation 313 of the inquiry signal 361A, the transmitter 210 transmits 315 an answer signal 315A. The inquiry signal 315A indicates to the vehicle that the transmitter 210 needs to be charged. In some forms, the transmitter 210 only transmits the answer signal 315A if the current battery charge level is below a predetermined threshold. In other forms, the transmitter 210 transmits the answer signal 315A regardless of whether the transmitter 210 needs to be charged. The answer signal 315A may include information regarding how much charging is needed, and the vehicle component 120 adjusts the charging power and/or the amount of time the charging field is produced based on the answer signal 315A. For example, the answer signal 315A may include a desired current, voltage, and/or power level to be provided by the charging coil 124.

If the vehicle receives 362 the answer signal 315A and the vehicle switched power supply is available 324, the vehicle checks 325 the status of the detection switch 125. As discussed above, the vehicle component 120 includes the switch 125 to determine if the transmitter 210 is in the recess 122. If the switch 125 is active, meaning the transmitter 210 is detected, the vehicle transmits 326 power to the transmitter by powering the charging coil 124 in order to inductively transmit electrical power to the coil 214 and the battery 215 of transmitter 210.

In some forms, the electrical power transmitted 326 is adjusted throughout the charging process to avoid overcharging the battery 215 of the transmitter 210. The transmitter 210 transmits 311 a power adjust signal 311A to control the vehicle's charging circuit to reduce or shut off the charging power. In one form, the transmitter 210 includes a timer and the transmitter 210 transmits the power adjust signal 311A after a predetermined amount of time has passed. In another form, the transmitter 210 includes a sensor configured to measure the charge level of the battery 215. The transmitter 210 transmits 311 the power adjust signal 311A once a predetermined charge threshold is met. In yet another form, the vehicle component 120 may include a timing circuit that automatically adjusts the charging power after a predetermined amount of time without receiving a signal from the transmitter 210.

When the power adjust signal 311A is received 327 by the vehicle, the power to the charging coil 124 is adjusted accordingly by the switch 127.

Figure 4:
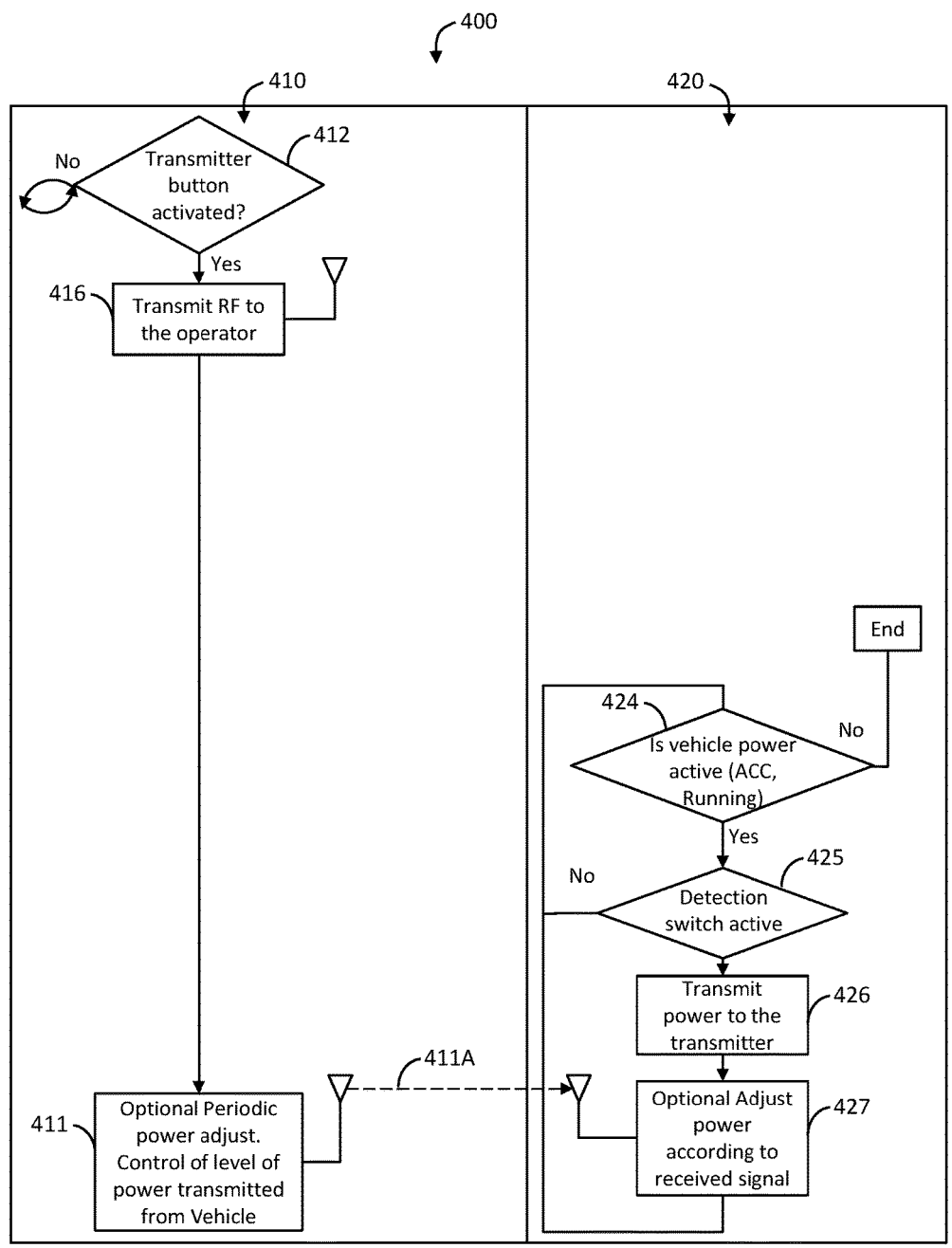
FIG. 4 is a flow diagram illustrating a method of recharging a transmitter.

In FIG. 4, a method 400 is provided in which the transmitter 210 is not validated by the vehicle 120. The method 400 includes a method 410 performed at the transmitter 210 and a method 420 performed at the vehicle. In the method 400, the transmitter button 212 is activated 412. In response to the activation of the button 212, the transmitter transmits 416 a RF signal to a movable barrier operator. The transmitter 210 does not transmit an initiation signal to the vehicle.

When the vehicle is powered 424, the detection switch 125 is monitored. When the detection switch 125 detects 425 a transmitter in the recess 122, the charging coil 124 is energized in order to transmit 426 power to the transmitter 210. As in method 300, the method 400 includes an optional step in which the transmitter 210 periodically transmits 411 a power adjustment signal 411A. In response to receiving the power adjust signal 411A, the vehicle adjusts 427 the charging power provided by the charging coil 124.

Because there is no validation process in the method 400, the vehicle may charge any transmitter inserted into the recess 122.

Figure 5A:
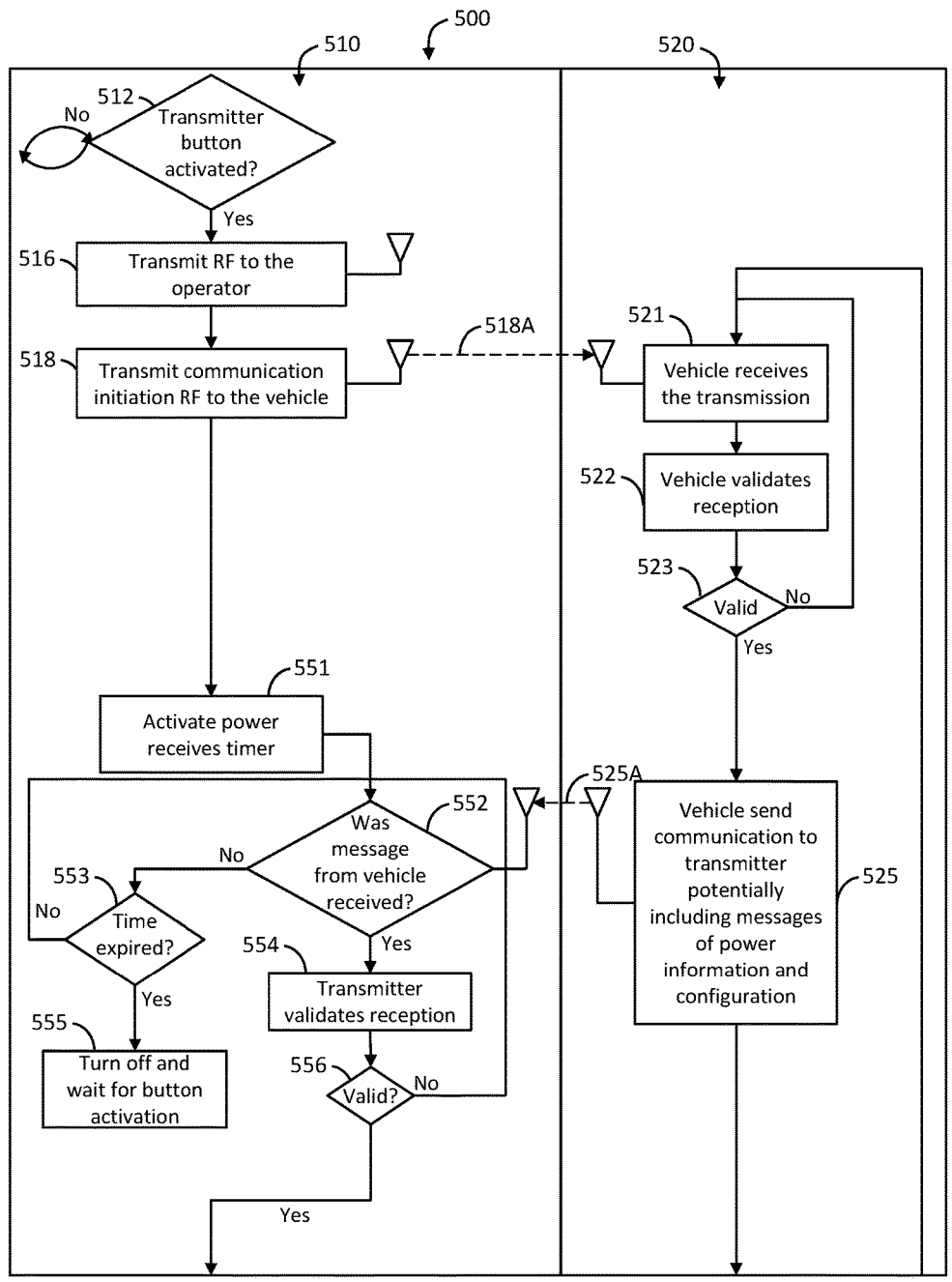
FIGS. 5A-5B are a flow diagram illustrating a method of recharging a transmitter.
Figure 5B:
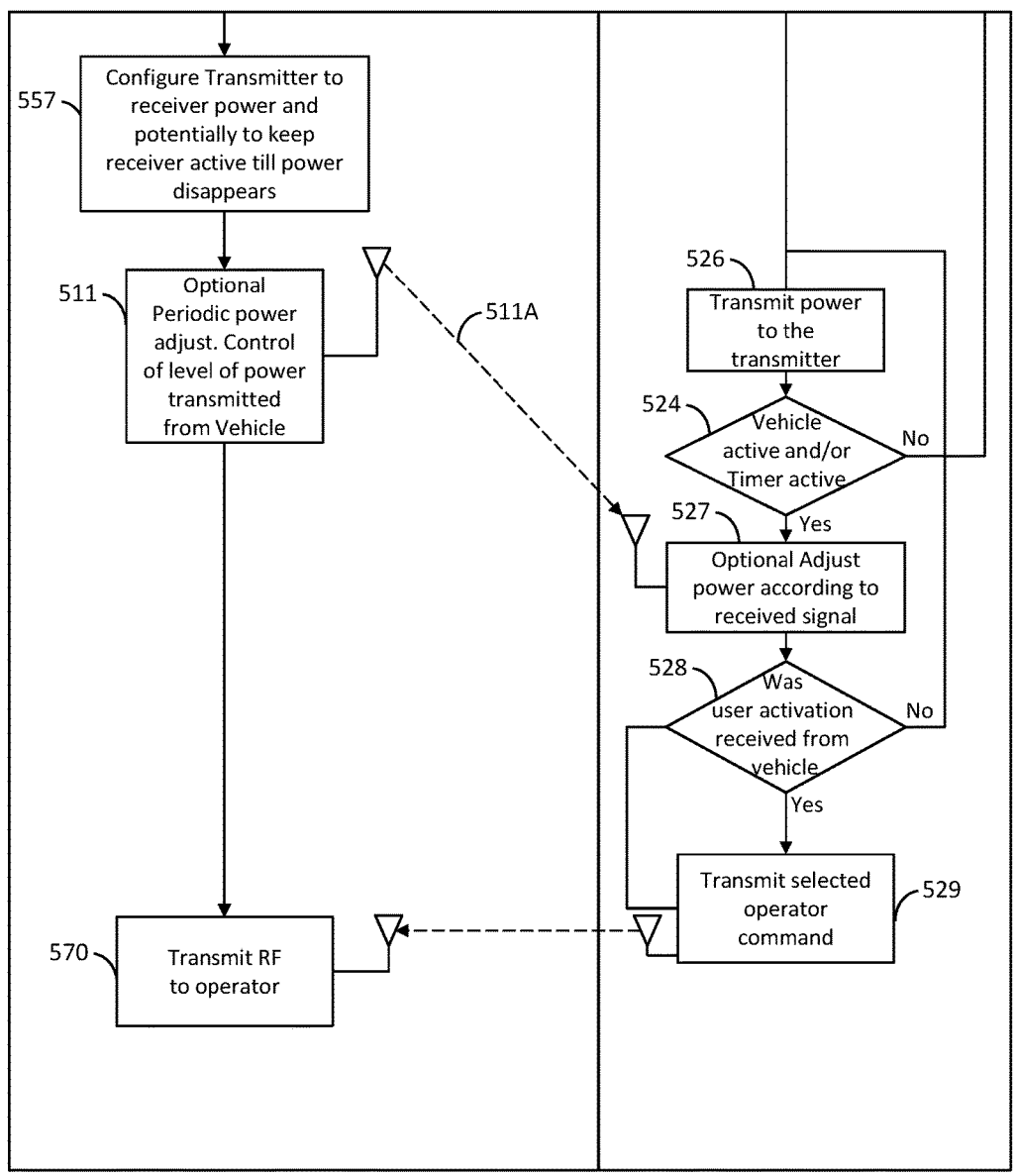

With reference to FIGS. 5A and 5B, a method 500 is provided in which the charging circuit in the transmitter 210 is only coupled to the battery 215 for a limited amount of time after the button 212 is pressed. The method 500 includes a method 510 performed at the transmitter 210 and a method 520 performed at the vehicle.

The method 500 begins in substantially the same manner as the method 300 above. The transmitter button 212 is activated 512 which causes the transmitter 210 to transmit 516 a signal to a barrier operator and transmits 518 an initiation signal 518A to the vehicle. The signal transmitted by the transmitter is received 521 by the vehicle and then validated 522, 523 as described above. In one form, at least a portion of the signal is encrypted using a rolling code encryption and validation 522 includes decrypting the code received at step 521.

When the button 212 is activated, the transmitter 210 activates 551 a power receiver timer. The power receiver timer counts the amount of time since the button 212 was last activated. The transmitter 210 is only configured to receive power from the vehicle for a predetermined amount of time after button 212 activation. The controller 211 controls the switch 231 between the induction coil 214 and the battery 215 based on the predetermined time and the reading of the timer. The controller 211 opens the switch 231 once the power receiver timer activated at step 552 has expired 553.

In one form, the vehicle transmits 525 an inquiry signal 525A to the transmitter 210 once the transmitter 210 is validated. This signal 525A may include information relating to the power configuration of the charging circuit of the vehicle. If the timer set at 551 expires 553 before reception of the signal 525 from the vehicle, the charging circuit of the transmitter 210 is turned off 555 until the next time the button is activated.

When the transmitter receives 552 the signal 525A from the vehicle 120, the transmitter 210 validates 554 the signal. Validation 554 by the transmitter 210 may be substantially similar to validation 522, 523 performed by the vehicle. The transmitter 210 includes the memory having a stored code which must be present in the received signal 525A in order to validate 554. In some forms, the code carried by the signal 525A is encrypted such as a rolling code. In still further forms, the code contained in the signal 525A must correspond to the code carried by the signal transmitted by the transmitter at step 516, such as being all or part of the signal transmitted by the transmitter at step 516.

In some embodiments, the transmitter 210 transmits an answer signal back to the vehicle to request charging if the signal 525A is valid. In some forms, the signal includes information indicating how much charging is required.

If the signal 525A received is valid 556, the induction coil 214 is electrically coupled to the battery 215 such that power can be received 557. In one form, the switch 231 of the transmitter 210 remains closed so long as charging power is present at the induction coil 214. Once power is no longer present at the induction coil 214, the switch 231 opens. In an alternative embodiment, the switch 231 is opened once the battery is charged or once a predetermined amount of time passes.

As in above embodiments, the vehicle may transmit 526 power to the transmitter 210 so long as the vehicle is powered and/or until a predetermined amount of time passes as determined at step 524. The vehicle component 120 may include the detection switch 125 which must detect the presence of a transmitter 210 in the recess 122 in order to power the charging coil 124.

In some forms, the transmitter transmits 511 a periodic charging power adjustment signal 511A, and the vehicle adjusts 527 the charging power accordingly when the signal 511A is received.

In some forms, the transmitter 210 transmits 518 the signal 518A to the vehicle after the vehicle has been detected by the transmitter 210. In one form, the vehicle is physically detected by the transmitter 210. A portion of the vehicle engages a mechanical switch or button of the transmitter 210 when the transmitter 210 is inserted into the recess 122. In other forms, the transmitter 210 receives a wireless signal from the vehicle. The wireless signal may be produced by the vehicle in response to the transmitter 210 being detected by the switch 125. The wireless signal can be the charging field generated by the induction coil 124. Alternatively, the wireless signal is an identifying signal, such as an RF or Bluetooth signal, which is transmitted by the vehicle and received by a wireless receiver of the transmitter 210. In some embodiments, the identifying signal is encoded, such as by rolling code, and includes information to identify the specific vehicle and/or the specific transmitter 210.

In one embodiment, the vehicle includes a user interface, such as buttons or a touchscreen on the steering column, center console, mirror, and/or display, which may be activated 528 to operate the transmitter 210. When the user activates 528 one of these inputs, the vehicle transmits 529 a signal 529A such as by RF or Bluetooth® that contains selected command to the transmitter 210. In response to receiving this command, the transmitter 210 undertakes the indicated operation, such as transmitting 570 a RF signal to a barrier operator.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. For example, the ability of a user to activate the transmitter via user inputs in the vehicle can be implemented in methods 300 or 400.

What is claimed is:

1. A portable rechargeable transmitter for operating a movable barrier operator, the transmitter comprising:
a battery;
an induction coil operably connected to the battery and configured to charge the battery with a current induced from an electromagnetic field produced by a vehicle component;
communication circuitry configured to transmit a radio signal to operate a movable barrier operator, the communication circuitry further configured to transmit an initiation signal to the vehicle component, the initiation signal including a code relating to the radio signal, and the communication circuitry further configured to receive an inquiry signal from the vehicle component that includes charging information; and
a controller operably coupled to the communication circuitry and configured to determine the charging information from the inquiry signal;
the controller further configured to cause the communication circuitry to transmit an answer signal to the vehicle component to initiate the electromagnetic field in response to the communication circuitry receiving the inquiry signal;
wherein the initiation signal includes information identifying the transmitter to be validated by the vehicle component, and wherein the inquiry signal includes information identifying the vehicle component,
wherein the controller is configured to validate the information identifying the vehicle component.

2. The transmitter of claim 1 wherein the controller is configured to cause the communication circuitry to transmit the initiation signal to the vehicle component prior to the communication circuitry receiving the inquiry signal from the vehicle component.

3. The transmitter of claim 2 wherein the controller is configured to cause the communication circuitry to transmit the initiation signal using a different communication protocol than the radio signal to operate the movable barrier operator.

4. The transmitter of claim 1 wherein the controller is configured to determine electrical energy available from the electromagnetic field based at least in part on the charging information of the inquiry signal.

5. The transmitter of claim 1 wherein the controller is configured to determine an energy level of the battery and cause the communication circuitry to transmit the answer signal with information regarding electrical energy needed to charge the battery.

6. The transmitter of claim 1 wherein the communication circuitry is configured to receive an encrypted inquiry signal and the controller is configured to decrypt the inquiry signal to determine the charging information provided by the vehicle component.

7. The transmitter of claim 1 wherein the communication circuitry is configured to transmit the radio signal such that the radio signal includes a variable code that changes with each radio signal transmitted by the communication circuitry.

8. The transmitter of claim 1 wherein the communication circuitry is configured to receive a wireless inquiry signal from the vehicle component and the controller is configured to cause the communication circuitry to transmit the answer signal wirelessly to the vehicle component to initiate the electromagnetic field.

9. The transmitter of claim 1 wherein the communication circuitry includes a transceiver configured to transmit the radio signal and wirelessly receive the inquiry signal from the vehicle component.

10. A method of charging a movable barrier operator transmitter connected to a component of a vehicle, the method comprising:
   transmitting an initiation signal from the transmitter to the component, the initiation signal including a code configured to operate a movable barrier operator;
   transmitting an inquiry signal from the component to the transmitter, the inquiry signal including charging information;
   transmitting an answer signal from the transmitter to the component that includes information responsive to the charging information; and
   energizing a charging coil of the component to create an electromagnetic field and charge a battery of the transmitter.

11. The method of claim 10 further comprising connecting the transmitter to the component of the vehicle by advancing at least a portion of the transmitter into a recess of the component.

12. The method of claim 10 wherein transmitting the initiation signal from the transmitter to the component includes transmitting a wireless signal that includes a fixed code identifying the transmitter and a variable code.

13. The method of claim 10 wherein energizing the charging coil of the component to create an electromagnetic field and charge the battery of the transmitter includes inducing a current in a coil of the transmitter.

14. The method of claim 10 wherein the transmitting the initiation signal, transmitting the inquiry signal, and transmitting the answer signal each include transmitting a wireless signal.

15. The method of claim 10 further comprising transmitting a radio frequency signal from the transmitter to a movable barrier operator.

16. The method of claim 10 further including validating the initiation signal at the component of the vehicle and validating the inquiry signal at the transmitter.

* * * * *